(12) United States Patent
Nahum et al.

(10) Patent No.: US 9,203,689 B2
(45) Date of Patent: *Dec. 1, 2015

(54) DIFFERENTIAL DYNAMIC HOST CONFIGURATION PROTOCOL LEASE ALLOCATION

(71) Applicant: International Business Machines Corporation, Armonk, NY (US)

(72) Inventors: Erich M. Nahum, New York, NY (US); Ioannis Papapanagiotou, Raleigh, NC (US); Vasileios Pappas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/661,349

(22) Filed: Oct. 26, 2012

(65) Prior Publication Data

US 2014/0122395 A1     May 1, 2014

(51) Int. Cl.
| | |
|---|---|
| G06F 15/18 | (2006.01) |
| G06N 3/00 | (2006.01) |
| G06N 3/12 | (2006.01) |
| H04L 12/24 | (2006.01) |
| H04L 29/12 | (2006.01) |

(52) U.S. Cl.
CPC ............ *H04L 41/00* (2013.01); *H04L 41/0803* (2013.01); *H04L 41/0886* (2013.01); *H04L 61/00* (2013.01)

(58) Field of Classification Search
USPC .......................................................... 706/13
See application file for complete search history.

(56) References Cited

U.S. PATENT DOCUMENTS

| | | | |
|---|---|---|---|
| 8,094,666 B2 | 1/2012 | Cagenius | |
| 8,140,651 B2* | 3/2012 | Pappas et al. | 709/221 |
| 8,478,878 B2* | 7/2013 | Freimuth et al. | 709/226 |
| 8,539,018 B2* | 9/2013 | Bisdikian et al. | 709/200 |
| 8,576,756 B2* | 11/2013 | Ko et al. | 370/310.2 |
| 8,804,721 B2* | 8/2014 | He et al. | 370/390 |
| 8,806,489 B2* | 8/2014 | Freimuth et al. | 718/1 |
| 8,832,007 B2* | 9/2014 | Nahum et al. | 706/12 |
| 8,832,375 B2* | 9/2014 | Agrawal et al. | 711/118 |
| 8,856,445 B2* | 10/2014 | Agrawal et al. | 711/118 |
| 8,891,541 B2* | 11/2014 | Calo et al. | 370/401 |

(Continued)

OTHER PUBLICATIONS

Realistic storage of pending requests in Content-Centric Network routers Wei You ; Mathieu, B. ; Truong, P. ; Peltier, J. ; Simon, G. Communications in China (ICCC), 2012 1st IEEE International Conference on DOI: 10.1109/ICCChina.2012.6356864 Publication Year: 2012 , pp. 120-125.*

(Continued)

*Primary Examiner* — Michael B Holmes
(74) *Attorney, Agent, or Firm* — Fleit Gibbons Gutman Bongini & Bianco PL; Jon A. Gibbons

(57) ABSTRACT

Disclosed is a novel passive fingerprinting technique based on DHCP messages to determine the device type and operating system. DHCP implementations are shown to vary among device types and have an effect on DHCP lease durations. To improve network address utilization, without introducing any protocol changes, the present invention provides a new leasing strategy which takes into account device types. This strategy, compared to current approaches, improves the address utilization sixfold without considerably increasing DHCP overhead.

10 Claims, 11 Drawing Sheets

(56) References Cited

U.S. PATENT DOCUMENTS

| | | | |
|---|---|---|---|
| 8,898,269 B2* | 11/2014 | Agrawal et al. | 709/223 |
| 8,909,749 B2* | 12/2014 | Branch et al. | 709/223 |
| 8,965,845 B2* | 2/2015 | Calo et al. | 707/610 |
| 2005/0105529 A1 | 5/2005 | Arberg et al. | |
| 2008/0008197 A1 | 1/2008 | Sakanashi et al. | |
| 2008/0294780 A1 | 11/2008 | Lanahan et al. | |
| 2009/0006635 A1 | 1/2009 | Siegmund | |
| 2009/0063833 A1 | 3/2009 | Ho | |

OTHER PUBLICATIONS

Mitigating Distributed Denial-of-Service Attacks: Application-Defense and Network-Defense Methods Zhang Fu Computer Network Defense (EC2ND), 2011 Seventh European Conference on DOI: 10.1109/EC2ND.2011.18 Publication Year: 2011, p. 59.*

An experimental study of client-side spotify peering behaviour Ellis, M.; Strowes, S.D.; Perkins, C. Local Computer Networks (LCN), 2011 IEEE 36th Conference on DOI: 10.1109/LCN.2011.6115205 Publication Year: 2011, pp. 267-270.*

MERTS: A more efficient real-time traffic support scheme for Content Centric Networking Haibo Li; Yang Li; Tao Lin; Zhijun Zhao; Hui Tang; Xiaolei Zhang Computer Sciences and Convergence Information Technology (ICCIT), 2011 6th International Conference on Publication Year: 2011, pp. 528-533.*

Brik, V., et al., "Debugging DHCP Performance," IMC'04, Oct. 25-17, 2004, Copyright 2004, ACM 1-58113-821-0/04/0010, pp. 257-262.

Maier, G., et al., "A First Look at Mobile Hand-Held Device Traffic," In Passive and Active Measurement, Springer, 2010.

Gember, A., et al., "A Comparative Study of Handheld and Non-Handheld Traffic in Campus Wi-Fi Networks," In Passive and Active Measurement, Springer, 2011, pp. 173-183.

Agrawal, R., et al., "Fast Algorithms for Mining Association Rules," Proceedings of the 20th VLDB Conference, Santiago, Chile, 1994.

Khadilkar, M., et al., "Usage-Based DHCP Lease Time Optimization," IMC'07 Oct. 24-26, 2007, pp. 71-76, ACM 978-1-59593-908-1/07/0010, Copyright 2007.

The Bro Network Security Monitor, http://www.bro-ids.org/, Copyright 2011 The Bro Project. Logo design by DigiP.

Ethernet Number Registration. http://www.iana,org/assignments/ethernet-numbers.xml, copyright Oct. 24, 2012.

Microsoft DHCP Vendor and User Classes, Article ID: 266674—Last Review Jan. 27, 2007—Revision 3.3, http://support,microsoft.com/kb/266675.

Aboba, B., et al., Detective Network Attachment in IPv4 (DNAv4), Network Working Group, Category: Standards Track, http://www.ietf.org/rfc4436.txt, Mar. 2006.

Simmons, D., "Rapid DHCP," Caffeinated Bitstream, Bits, bytes, and words, posted at Jul. 17, 2011.

Droms, R., "Dynamic Host Configuration Protocol," Network Working Group, Request for Comments: 2131, Category: Standards Track, Mar. 1997.

Apple, "DHPC.C", @Apple_License_Header_Start@, http://www.opensource.apple.com/source/bootp/bootp-198.2/IPConfiguration.bproj.dhcp.c, copyright 1999-2010 Apple Inc.

Non Final Office Action dated Jan. 16, 2014 for U.S. Appl. No. 13/758,229.

* cited by examiner

200

⊞ Frame 75: 342 bytes on wire (2736 bits), 342 bytes captured (2736 bits)
⊞ Ethernet II, Src: 42:09:02:XX:YY:ZZ (42:09:02:XX:YY:ZZ), Dst: ☐
⊞ Internet Protocol Version 4, Src: ☐ , Dst: ☐
⊞ User datagram Protocol, Src Port: bootps (67). Dst Port: bootps (67)
⊟ Bootstrap Protocol
    Message type: Boot Request (1)
    Hardware type: Ethernet
    Hardware address length: 6
    Hops: 1
    Transaction ID: 0xa57f8cd9
    Seconds elapsed: 0
   ⊞ Bootp flags: 0x0000 (Unicast) — 212 — 214
    Client IP address: 0.0.0.0. (0.0.0.0)
    Your (client) IP address: 0.0.0.0 (0.0.0.0)
    Next server IP address: 0.0.0.0 (0.0.0.0)
    Relay agent IP address: 0.0.0.0 (0.0.0.0)
    Client MAC address: Apple_XX:YY:ZZ (00:26:b0:XX:YY:ZZ)   *First 3 Bytes of MAC Address*
    Client hardware address padding: 000000000000000000
    Server host name not given
    Boot file name not given
    Magic cookie: DHCP
   ⊞ Option: (t=53, l=1) DHCP Message Type = DHCP Request
   ⊟ Option: (t=55, l=6) Parameter Request List
      Option: (55) Parameter Request List
      Length: 6
      Value: 0103060f77fc — 218
      1 = Subnet Mask
      3 = Router
      6 = Domain Name Server
      15 = Domain Name
      119 = Domain Search [TODO:RFC3397]
      252 = Private/Proxy autodiscovery
   ⊞ Option: (t=57, l=2) Maximum DHCP Message Size - 1500
   ⊞ Option: (t=61, l=7) Client identifier
   ⊞ Option: (t=50, l=4) Requested IP Address = ☐
   ⊞ Option: (t=51, l=4) IP Address Lease Time = 90 days
   ⊞ Option: (t=12, l=6) Host Name = "iphone"  *Host Name*
    End Option
    Padding 216 — *"Parameter Request List" fields sequence*

"Options" fields sequence

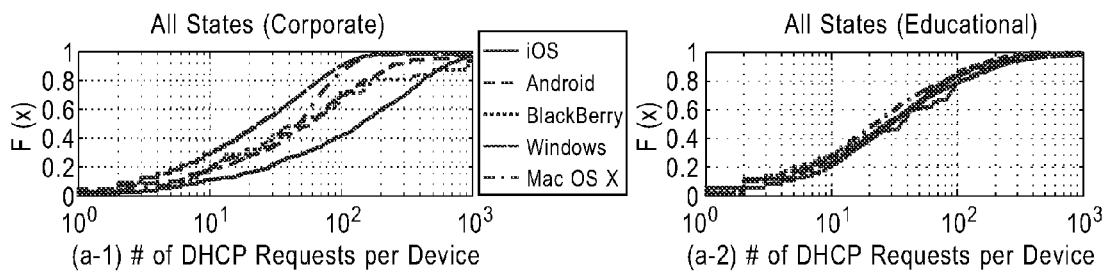
FIG. 3A    FIG. 3B
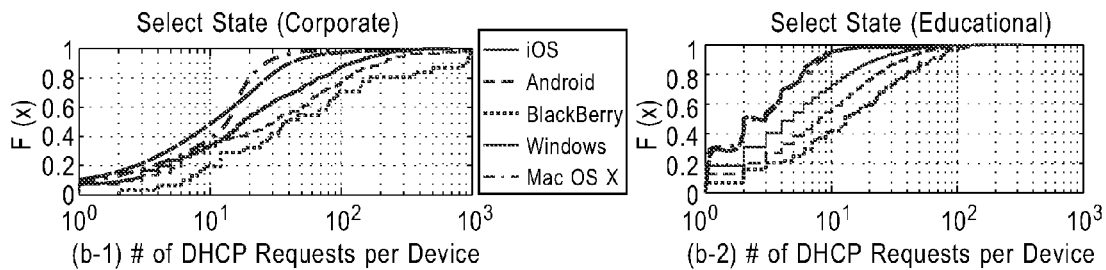
FIG. 3C    FIG. 3D
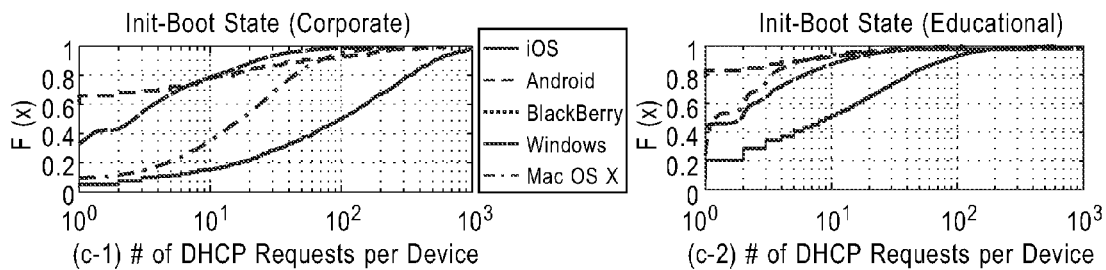
FIG. 3E    FIG. 3F
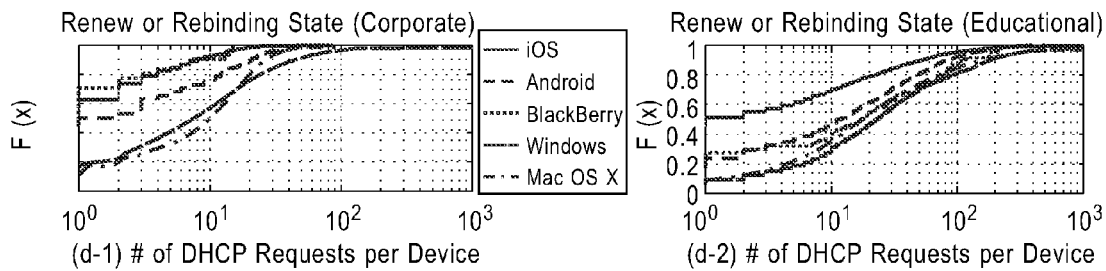
FIG. 3G    FIG. 3H

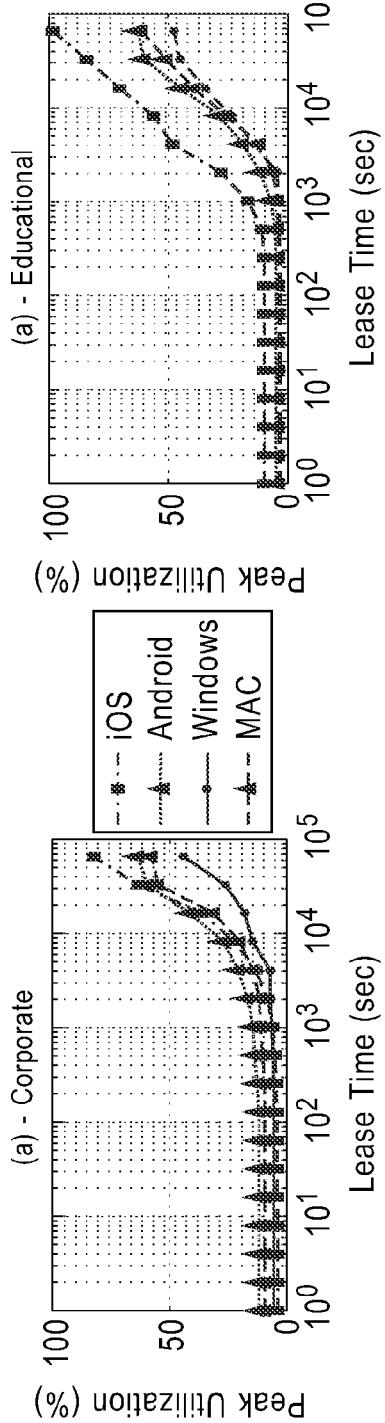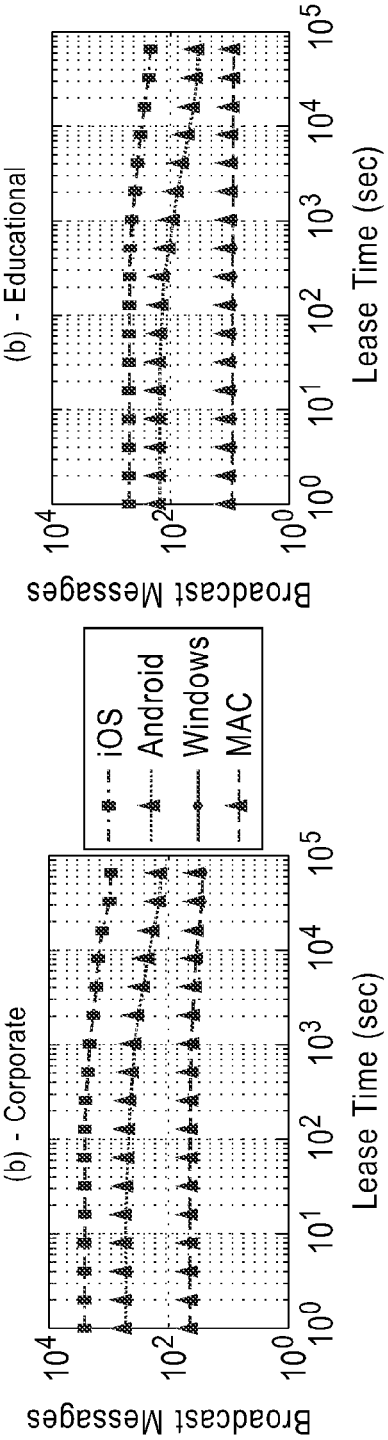
FIG. 7B
FIG. 7D
FIG. 7A
FIG. 7C

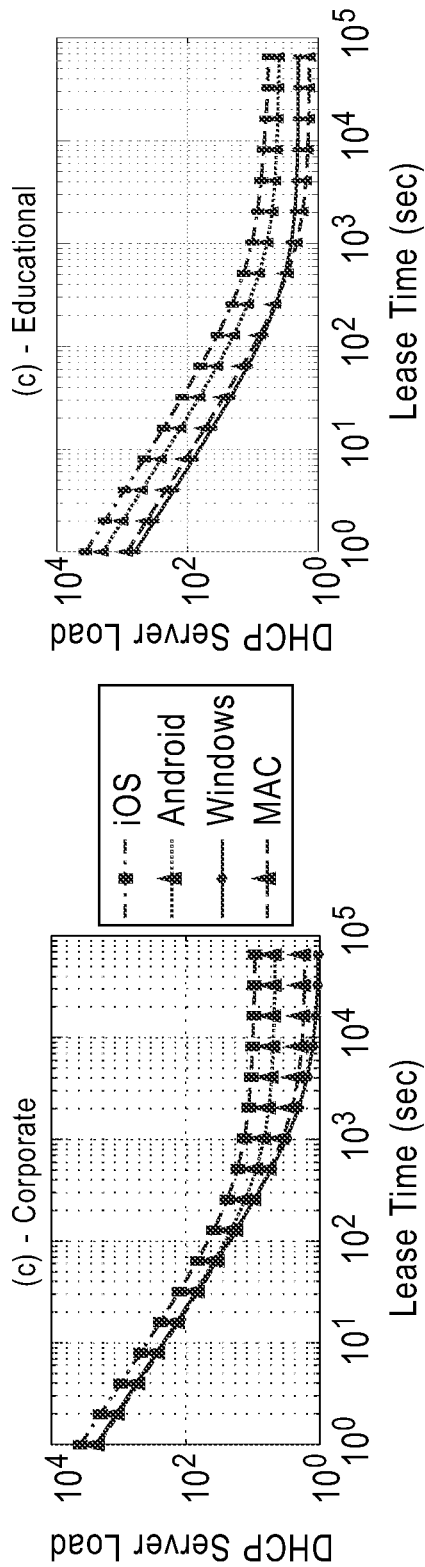

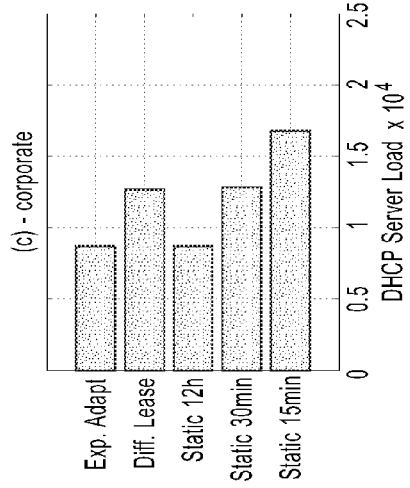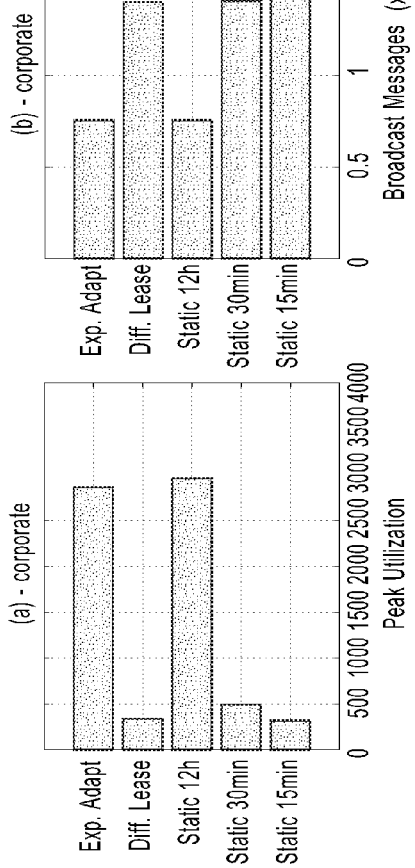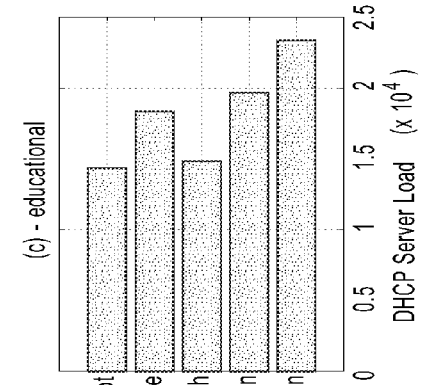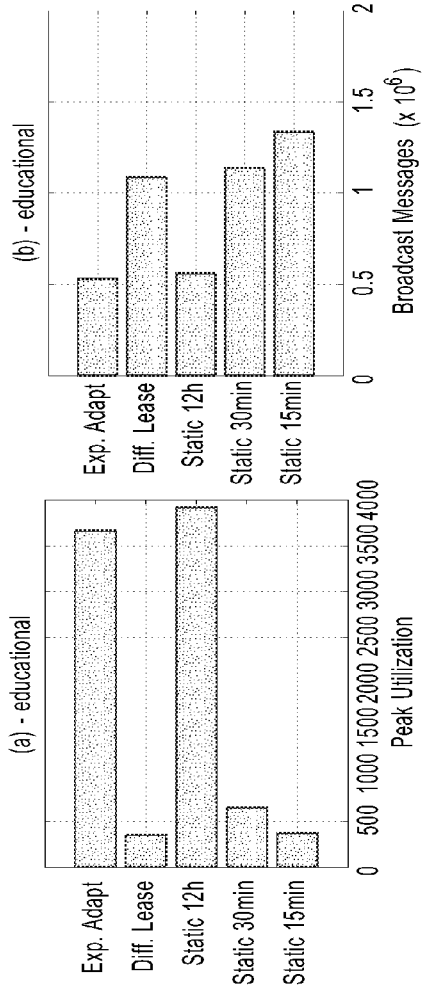
FIG. 8A  FIG. 8B  FIG. 8C  FIG. 8D  FIG. 8E  FIG. 8F

DIFFERENTIAL DYNAMIC HOST CONFIGURATION PROTOCOL LEASE ALLOCATION

BACKGROUND

The present invention relates to Internet Protocol (IP) address management on networks and more specifically to Dynamic Host Configuration Protocol (DHCP) management.

The Dynamic Host Configuration Protocol (DHCP) [8] enables devices to attach to networks without manual configuration. It does, however, require manual configuration of access policies at the DHCP servers. One of the most critical parameter of the DHCP server configuration is the lease duration, indicating how long a device can use an IP address. Setting up proper DCHP lease values has been an art rather than a science. Long lease times can lead to exhaustion of the network address pool assigned for DHCP, while short ones can result in increased broadcast traffic and unnecessary activation of wireless interfaces by power limited devices.

There have been few studies on the DHCP lease times [7, 10], both of which were done before the onslaught of smartphones in local area networks. Smartphones present a challenge in correctly configuring DHCP leases. A single device may acquire multiple IP addresses during a day due to its continuous attachment, in either asleep or active mode, with the campus-wide wireless networks. For example, as a student moves from one side of the campus to another, her devices can re-associate with various campus subnets, acquiring a different address each time. In this scenario, setting DHCP lease times even as low as one hour may not necessarily be enough to reduce network address utilization.

BRIEF SUMMARY

Disclosed is a novel passive fingerprinting technique based on DHCP messages to determine the device type and operating system. DHCP implementations are shown to vary among device types and have an effect on DHCP lease durations. To improve network address utilization, without introducing any protocol changes, the present invention provides a new leasing strategy which takes into account device types. This strategy, compared to current approaches, improves the address utilization sixfold without considerably increasing DHCP overhead.

In one example, a novel system, computer program product, and method to set lease times values in a network protocol for a device is disclosed. The method comprises inspecting, at a host system, a network request message generated by a client system. Next, the client system is classified into a category from a plurality of categories based on the network request message. The category is used to associate a value of a lease time for the client system. Classification rules in one example are based on data mining techniques. An algorithm for learning association rules may be used to classify the client system into a category from a plurality of categories based on the network request message. Lease duration times are automatically associated to each class of devices. In one example, the present invention provides a quantitative outcome of the classification using supervised-machine learning algorithms. These algorithms may be used to automatically associate the value of the lease through the use of a training data set of DHCP-request messages with a machine learning algorithm. For example, "if the Device-Class is IOS then the Lease is 30 minutes."

Alternatively any of the two previous steps can be performed manually. For example, a network administrator can 'handcraft' the rules based on regular expressions. One such handcrafted rule can be in the form of: "if Vendor-Name is APPLE and Host-Name contains IPHONE then the Device-Class is IOS". Similarly instead of automatically identifying the lease times for each device class based on historical data, an administrator can 'handpick' the leasing times for each device type. For example it can add a rule.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a screen shot of a DHCP transmission of a client generated DHCP-request message;

FIGS. 3A to 3H is a series of cumulative distribution function graphs of the message exchange between hosts and DHCP servers in a corporate and educational network;

FIGS. 7A to 7F is a series of cumulative distribution function graphs of address space utilization, broadcast message. and server load versus lease time average per day and per device;

FIGS. 8A to 8F is a series of bar graphs of address space utilization, broadcast message and server load for various policies average per day;

DETAILED DESCRIPTION

To further understand the impact of smartphone devices on DHCP lease times, two one-month long packet traces were analyzed, collected from a corporate and an educational network. The present invention includes the following contributions:

A novel device and operating system fingerprinting technique is disclosed based on DHCP messages, which significantly improves the accuracy upon previous fingerprinting techniques that are based on a combination of MAC layer vendor names and HTTP User-Agent information [11].

DHCP message exchanges are shown to vary both across device types (e.g., laptops, smartphones) and across operating systems (e.g., iOS, Android, Windows, Mac OS X, Linux), with each device type contributing a different amount of DHCP related traffic and having a varying effect on the network address utilization.

A new DHCP leasing strategy is described that does not require any protocol changes, and which takes advantage of the varying usage patterns per device type. Using simulation results, driven by these traces, the present invention uses a new leasing strategy, compared to current approaches, improves the network address utilization sixfold without considerably increasing DHCP overhead.

DHCP Background

Figure 1:
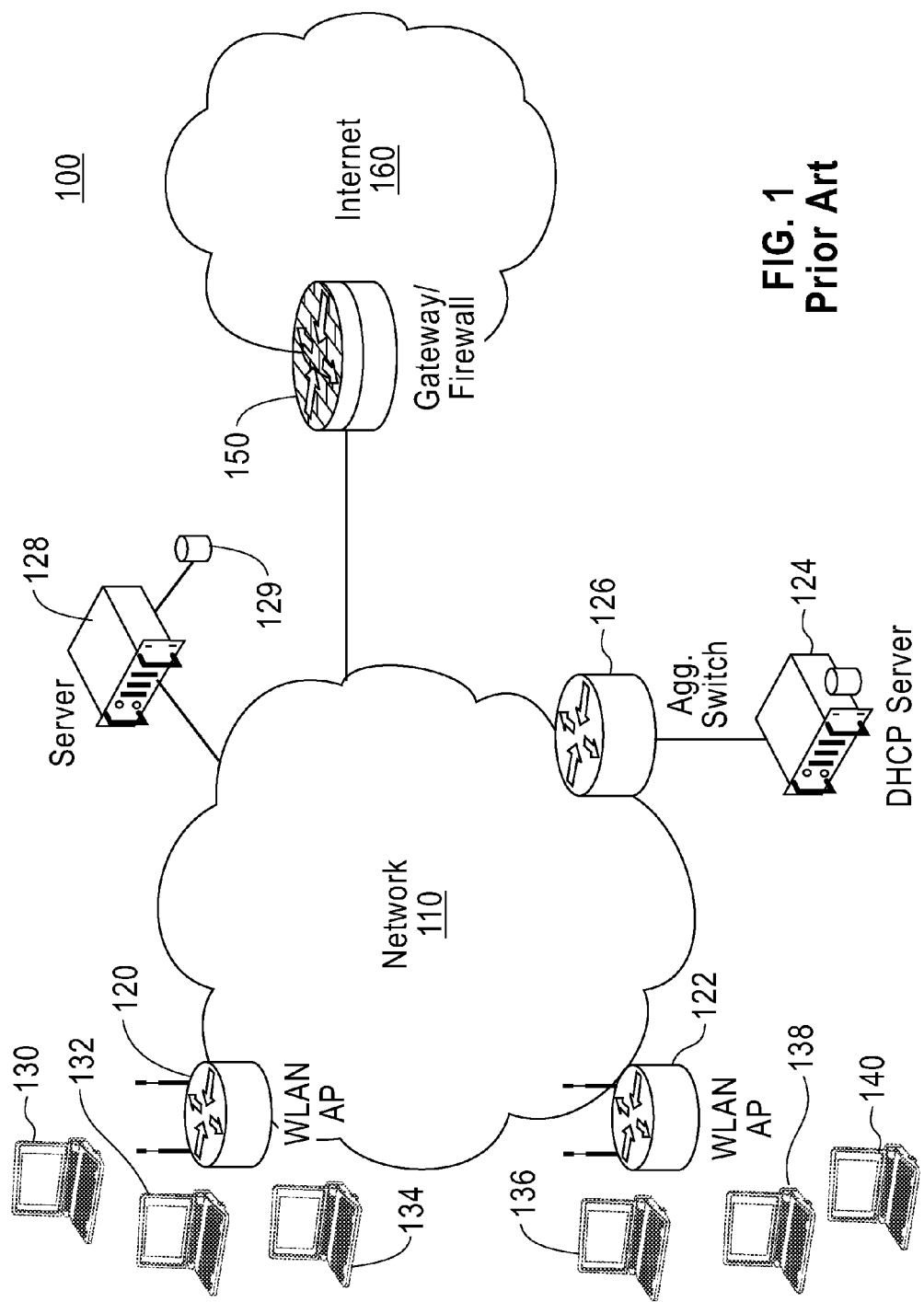
FIG. 1 is a block diagram illustrating an operating environment of DHCP server.

DHCP [8] enables automatic network configuration of hosts in TCP/IP networks, with a message exchange between hosts and DHCP servers. FIG. 1 is a block diagram 100 illustrating an operating environment of DHCP server. A private network 110 is communicatively coupled to a public network 160. The private network 110 is a company or organization's private network. The public network 160 is a global communication infrastructure such as the Internet. The private network 110 and public network 160, in this example, comprises one or more types of networks, such as wide area networks, local area networks, and/or wireless networks. The networks support one or more protocols including DNS, IMAP, SMTP, NTP, FTP, HTTP, SSH, and RTP.

One or more client systems 130-140 are communicatively coupled to the private network 110. Also shown is a local server 128 and a DHCP server 124 through a switch 130. The local server 128 in this example is coupled to a database 129. The private network 110 typically communicates via a firewall 150 to a public network 160.

Referring to the private network 110 the following discussion is directed to DHCP protocol messages. To begin, a discover message is broadcasted to locate available servers. The listening server replies with an offer, which contains the client MAC address. The client generates a request ("selecting" state) asking for offered parameters from one server and implicitly declining offers from all others. However, there are other occasions in which a client issues a request message, such as confirming correctness of previously allocated address after, e.g., system reboot ("init-reboot" state), or extending the lease on a particular network address ("renewing" or "rebinding" state). The RFC-2131 defines the "renewing" and "rebinding" as different states. Their only difference is the way they request a lease extension, i.e., broadcast or multicast.

The server responds to a request with either an acknowledgment, if the request is granted, or a negative acknowledgment, in the case where the parameters are incorrect or the lease has expired. The acknowledgment contains the lease time for which the network address will be valid, either as a new lease, or as an update. The client may extend its lease with subsequent request messages sent periodically after half the lease period. For example, if the lease time is 14400 seconds, and the client is still active after 7200 seconds, it can generate a request message at that time to notify the server. If the lease time expires, the server assumes that the device has been disconnected from the network. The client can issue an explicit release message, but this is not mandated by the RFC.

Finally, an inform message is sent from the client to the server to ask for local configuration parameters. This only happens when the client already has an externally configured network address.

Packet Trace Analysis

Packet traces are captured from two large wireless local area networks, one from a corporate office network and one from an educational campus network. Table 1 summarizes the two traces, including their static lease policies.

TABLE 1

| Trace Type | Corporate | Educational |
| --- | --- | --- |
| Dates (2012) Client | Feb 29-Mar 25 | Jan 15-Feb 15 |
| MAC Addresses | 2980 | 8726 |
| Client IP Addresses | 3435 | 1968 |

TABLE 1-continued

| Trace Type | Corporate | Educational |
| --- | --- | --- |
| Wireless Subnets | 8 */23 | /21 |
| Leases | 1 h or 12 h | 15 min |
| DHCP Packets | 2.16M | 3.48M |
| TCP/UDP Bytes | 2.5TB | 4.9TB |

Using the traces, the two types of data are analyzed. First, DHCP packets are examined, in order to uniquely identify devices using MAC addresses, classify them based on the device type and the operating system, analyze network address utilization and emulate lease policies. Second, TCP and UDP packets are captured using Bro 2.0 [1] to create summary log files for TCP and UDP flows, which enables us to determine the time periods in which devices are active.

Device Classification

In this Section we describe how we identify the types of devices in our network using packet information and data mining rules. We create a set of classification rules based on the arguments that are included in the options of the DHCP Request:

Host-Name: We see if it contains a device specific string. Some cellphones set their host-name to a string that can identify the type of the device. For example, many iOS cellphones have names that follow the pattern of '*-iPhone', where usually corresponds to a string related to the user.

Vendor-Name: We see if it contains an operating-system specific string. Some OSs include, in their vendor-name, a string that can uniquely identify the OS. For example, most versions of Microsoft Windows include the string 'MSFT' [3].

Parameter-Request-List: We see if it contains specific DHCP options. A DHCP request contains a list of parameters indicating the set of DHCP options that a client is interested in. Some of these options (as well as their combinations and ordering) are unique for each device, as they typically indicate its auto-configuration capabilities.

MAC-Address: We see if the first three bytes of the device MAC address can be associated with a specific vendor, also called the Organization Unique Identifier (OUI). Using the LANA Ethernet assignments [2], we determine the vendor of the interface and then we identify if that vendor can be directly mapped to a specific type of device.

We use association rules to determine regularities between certain of the above values. For example, an association rule can be expressed as follows: given a host-name containing the string 'BlackBerry', what is the probability that the vendor-name will contain the string 'BlackBerry' (2-itemset). We select only few of all possible association rules by using breadth-first search, and prune those that are infrequent (low support) or have low confidence (similar to a-priori algorithm [5]).

To quantify the confidence of the rules, we used standard data mining metrics: Support supp(X) is defined as the portion of all devices that satisfy the rule x. Confidence conf(X $\Rightarrow$ Y) of an association rule X $\Rightarrow$ Y is defined as supp (X$\cap$Y)/supp(X), where supp(X$\cap$Y) is the support of rule X$\wedge$Y, namely, the portion of all devices that satisfy both rule X and Y. The rules that have high confidence in at least one direction (conf(X $\Rightarrow$ Y) and conf(Y $\Rightarrow$ X)), and are not contradictory, are broken into their corresponding itemsets X and Y. Those rules are then used for potential classification. For example, [host-name contains Android'] $\Rightarrow$ [Parameter-Request-List contains '1 121 33 3 6 28 51 58 59'] happens with confidence 100%. The reverse direction [Parameter-Request-List contains '1 121 33 3 6 28 51 58 59']⇒ [host-name contains Android'] happens with confidence 82.35%, and the remaining 17.63% are related to a device that neither has 'Android' in the host name (e.g., when the user has modified the default host-name) nor any other name from another device type. Now a host-name that contains 'Android' or a Parameter-Request-List that contains '1 121 33 3 6 28 51 58 59', can be used to classify Android devices. In other words, we assume no ground-truth but quantify every rule. Table 1 summarizes some common association rules produced with the DHCP classification process.

However, there are some unique rules that contain useful information. For example, we have observed that the Parameter-Request-List may be slightly different across the vendors of each 'Android' device, but the same for each device manufactured by each vendor. Hence for some of these rules, we apply a Bayesian Classifier to identify the device. We classify into the following categories: Windows, Linux, Mac OS X, Other Laptop, Android, Symbian, Blackberry, iOS, Windows Mobile, Other Mobile, Cisco VoIP, and Uncategorized. We use the first identified device, as some of the laptops may run multiple OSs (e.g., multiple boot clients or those running virtual machines).

TABLE 2

| Device | OS | Corporate # | Corporate % | Educational # | Educational % |
|---|---|---|---|---|---|
| Laptop | All | 2176 | 73.02 | 3970 | 45.50 |
|  | Windows | 1787 | 59.97 | 2819 | 32.21 |
|  | Mac OS X | 385 | 12.92 | 1131 | 12.96 |
|  | Linux | 4 | 0.13 | 20 | 0.23 |
| SmartPhone | All | 735 | 23.66 | 4489 | 51.44 |
|  | iOS | 577 | 119.36 | 3069 | 35.17 |
|  | Android | 126 | 4.24 | 1334 | 15.29 |
|  | Blackberry | 31 | 1.04 | 84 | 0.96 |
|  | Win Mobile | 1 | 0.03 | 2 | 0.02 |
| Other | All | 69 | 2.32 | 267 | 3.06 |
|  | Cisco VoIP | 9 | 32 | — | — |
|  | Unidentified | 60 | 2.01 | 267 | 3.06 |
| All |  | 2980 | 100 | 8726 | 100 |

We also compare the classification results by using the algorithm from [11], which is based on the combination of HTTP User-Agents (UA) and an audit database of OUIs. We use data from the DHCP Request to reconstruct the audit database, since in our network the packet MAC addresses were not corresponding to the end-users. We use the definitions of "unknown" (conflicting UAs) and "unclassified" (failure to classify based on the filters) from [11]. As shown in Table 2 our methodology classifies >98% of the devices, compared to 83.7% of [11], and does not misclassify any OS (unknown category). The reason for this difference is that any classification based on HTTP UAs is prone to errors. For instance, we have observed in our trace software development kits installed on laptops that emulate iPhone browsers, virtual machines running on top of a laptop, user-agent strings that are related to applications in laptops and not to devices, or encrypted user agents. All of these can lead to a potential misclassification.

TABLE 3

Association Rule (Rule 1⇒ Rule2)

| Device | OS | Rule 1 | Rule 2 | Confidence |
|---|---|---|---|---|
| Laptop | Windows | Vendor contains 'MSFT' | List: 1 15 3 6 44 47 31 33 249 43 | 99.18% |
|  |  | List: 1 15 3 6 44 46 47 31 33 249 43 | Vendor contains 'MSFT' | 93.00% |
|  | Mac OS X | Host contains "Macbook' | List: 1 3 6 15 119 252 44 46 47 | 100.00% |
|  |  | Host contains "Macbook' | MAC-Vendor = Apple | 100.00% |
|  |  | List: 1 3 6 15 119 95 252 44 46 47 | MAC-Vendor = Apple | 100.00% |
|  | Linux | Host contains "Ubuntu' | List: 1 28 2 3 15 6 119 12 44 47 26 121 42 | 100.00% |
| Smartphone | iOS | Host contains "iPhone|iPad|iPod' | List: 1 3 6 15 119 252 | 100.00% |
|  |  | Host contains "iPhone|iPad|iPod' | MAC-Vendor = Apple | 100.00% |
|  |  | List: 1 3 6 15 119 252 | MAC-Vendor = Apple | 100.00% |
|  | Android | Host contains 'Android' | Vendor contains 'dhcpcd' | 100.00% |
|  |  | Host contains 'Android' | List: 1 121 33 3 6 28 51 58 59 | 100.00% |
|  |  | List: 1 121 33 3 6 28 51 58 59 | Vendor contains 'dhcpcd' | 100.00% |
|  |  | List: 1 121 33 3 6 28 51 58 59 | Host contains 'Android' | 82.35% |
|  |  | Vendor contains 'dhcpcd' | Host contains 'Android' | 60.87% |
|  | BlackBerry | Host contains 'BlackBerry' | Vendor contains 'BlackBerry' | 100.00% |
|  |  | Host contains 'BlackBerry' | List: 1 3 6 15 | 100.00% |
|  |  | List: 1 3 6 15 | Vendor contains 'BlackBerry' | 100.00% |
|  |  | Host contains 'BlackBerry' | MAC-Vendor = RIM | 100.00% |
| Other | Cisco VoIP | Vendor contains 'Cisco Wireless Phone' | List: 1 3 6 12 15 28 42 66 149 150- | 100.00% |
|  |  | List: 1 3 6 12 15 28 42 66 149 150 | Vendor contains 'Cisco Wireless Phone' | 100.00% |

Lease Time Analysis

Using the DHCP-based device classification of the previous section, the DHCP request messages are analyzed. Table 4 shows the acknowledged DHCP request messages for each device type, as a percentage of the total requests, as well as the absolute mean and median values.

TABLE 4

| Type | Corporate | | | Educational | | |
|---|---|---|---|---|---|---|
| | % | Mean | Median | % | Mean | Median |
| iOS | 51.6 | 251 | 140 | 35.74 | 158 | 38 |
| Android | 5.88 | 123 | 58 | 11.44 | 117 | 37 |
| BlackBerry | 2.68 | 200 | 48 | 0.88 | 135 | 42 |
| Windows | 31.16 | 51 | 24 | 39.6 | 190 | 45 |
| Mac OS | 7.08 | 52 | 48 | 12.38 | 148 | 38 |
| Other | 2.2 | — | — | 0.4 | — | — |

The acknowledged requests are used so that messages generated by DHCP relays are not included. The distinct behavioral differences are observed between the corporate and educational network. In the corporate network, smartphones, especially iOS devices, generate considerably more DHCP requests on average as compared to laptops. In contrast, in the educational network all devices generate roughly the same number of requests. FIG. 3, which shows the cumulative distribution of requests per device type, illustrates this more clearly. This difference between the corporate and educational network is due to the smaller lease time of the educational network, forcing all devices to generate frequent lease renewal requests, as shown by the larger number of requests per device in that network.

To better understand the differences, the distribution of DHCP request message types are presented in Table 5.

TABLE 5

| | Corporate | | |
|---|---|---|---|
| Type | Select | Init-Reboot | Renew |
| iOS | 13.19 | 85.62 | 1.191 |
| Android | 72.40 | 17.52 | 10.09 |
| BlackBerry | 94.05 | 0.00 | 5.95 |
| Windows | 33.53 | 23.99 | 42.48 |
| Mac OS | 20.33 | 56.18 | 22.49 |
| | Educational | | |
| Type | Select | Init-Reboot | Renew |
| iOS | 13.06 | 57.4 | 29.54 |
| Android | 28.46 | 10.78 | 60.76 |
| BlackBerry | 35.53 | 0.00 | 64.47 |
| Windows | 3.99 | 10.39 | 85.62 |
| Mac OS | 4.91 | 8.79 | 86.3 |

In the educational network, with the exception of the iOS devices, the majority of the DHCP requests are renewals. In contrast, in the corporate network a considerably smaller percentage of the requests are renewals. Given the small number of renewal requests in the corporate network, other types of requests become more prominent, revealing a number of distinctions between device types. For example, iOS devices, and to a lesser extent Mac OS X devices, generate a large proportion of init-reboot requests. In contrast, Android and Black-Berry devices generate mainly select requests, meaning once they acquire a new address, they rarely contact the DHCP server again.

This difference between Apple and other devices is attributed to the implementation of DNAv4 [4] in iOS and Mac OS X [6, 12]. DNAv4 optimizes the re-attachment to a previously connected network by attempting to reuse a previous but still valid configuration, by reducing the number of DHCP exchange messages and by using unicast ARP requests. In this trace unicast ARP requests associated with DHCP init-reboot requests are observed to be coming from Apple devices.

Figure 4A:
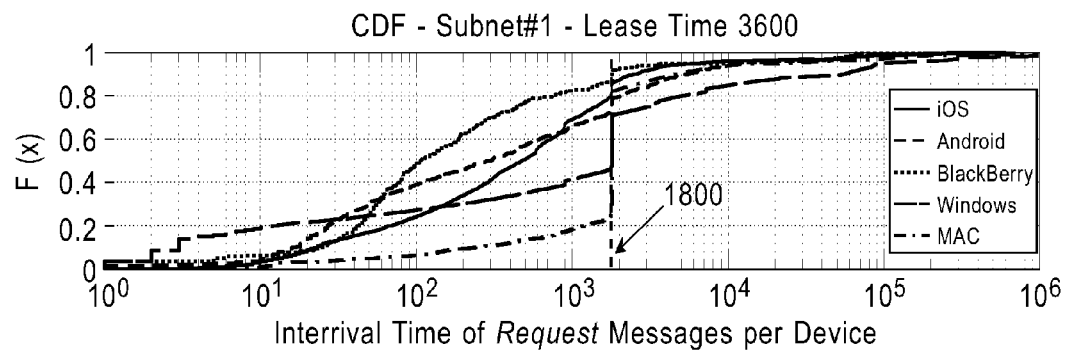
FIGS. 4A to 4C is a series of cumulative distribution function graphs of the a time interval of Request messages with different Lease Time setting.
Figure 4B:
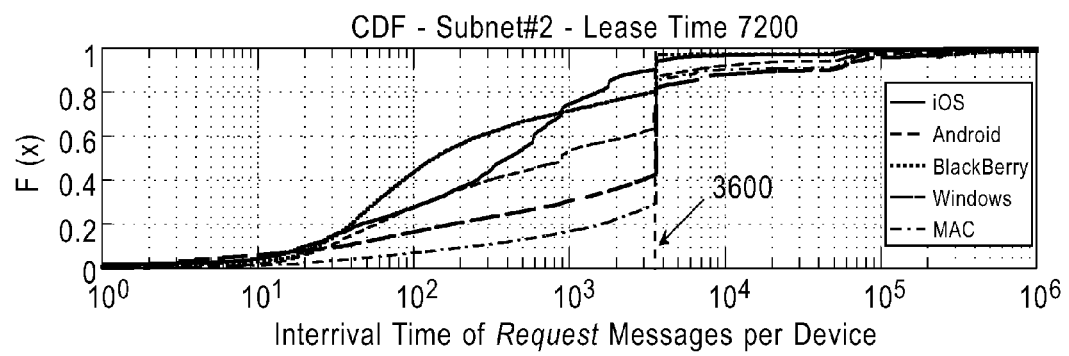
Figure 4C:
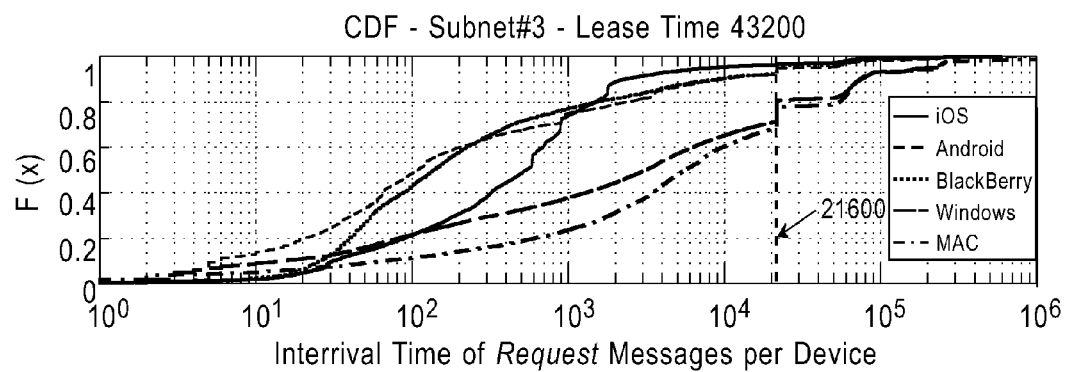

Finally, in FIG. 4, the interarrival time of the DHCP request messages is plotted. The first graph corresponds to the educational network, and the second two to the corporate network (with leases of one hour and twelve hours respectively). A dotted vertical line is used to indicate the time corresponding to half of the lease time. This is the time at which a DHCP client requests a lease extension. In the educational network, the majority of the request messages have been generated at half of the lease time, indicating that they are renewal requests. In the corporate network, where the lease times are larger, the devices generate far fewer requests for renewing an IP address.

Network Access Patterns

Proper setting of DHCP lease times depends on the amount of time devices stay active in the network, i.e., the amount of time they send or receive data. Note that the active time does not depend on the configuration of lease times. For a particular host, as identified by its MAC address, the following is defined:

Active Time: The time period, starting at the initial DHCP lease offer, up to the last time that any packet was generated, before the next lease offer.

Inactive Time: The time period between the end of an active period and the beginning of the next active period.

Figure 5:
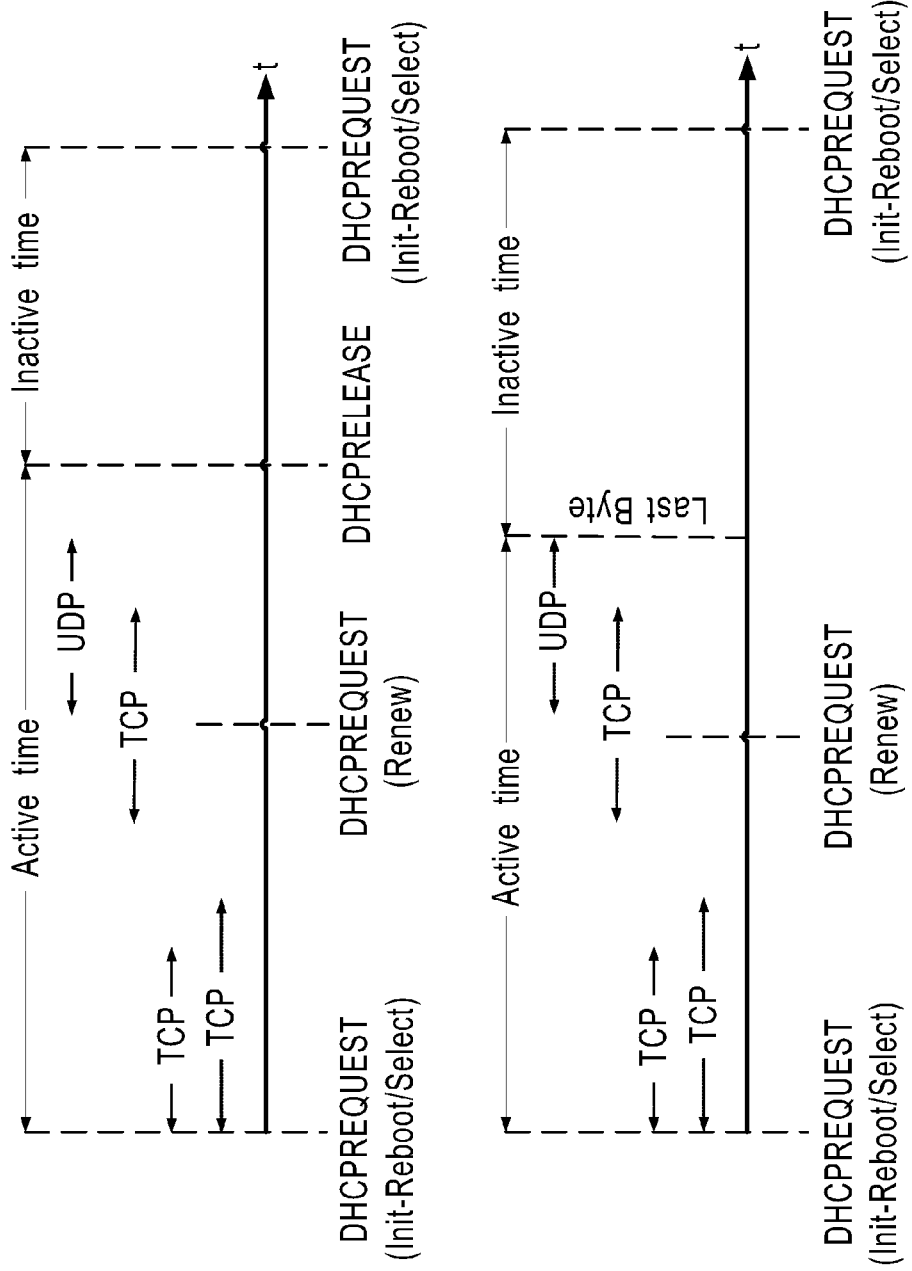
FIG. 5 is a timeline of Active and Inactive times.
Figure 6B:
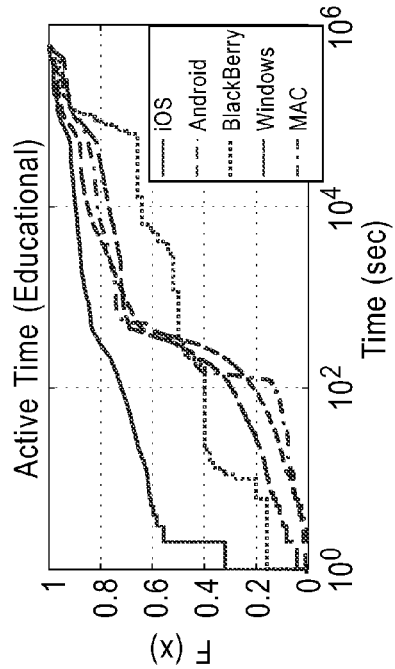
FIGS. 6A to 6D is a series of cumulative distribution function graphs of the Active and the Inactive durations.
Figure 6D:
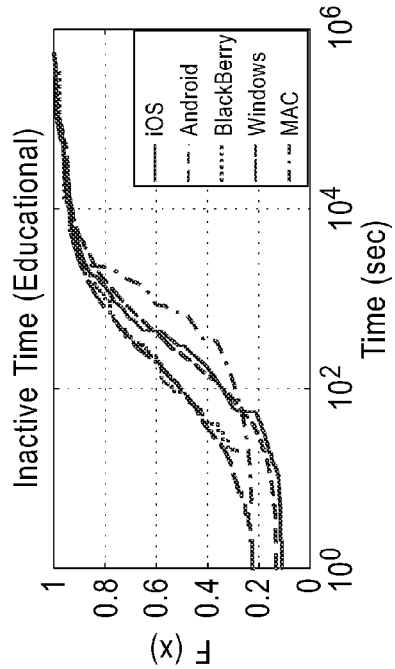
Figure 6A:
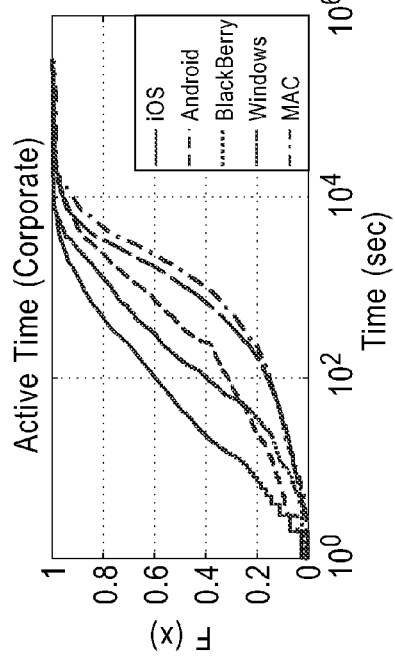
Figure 6C:
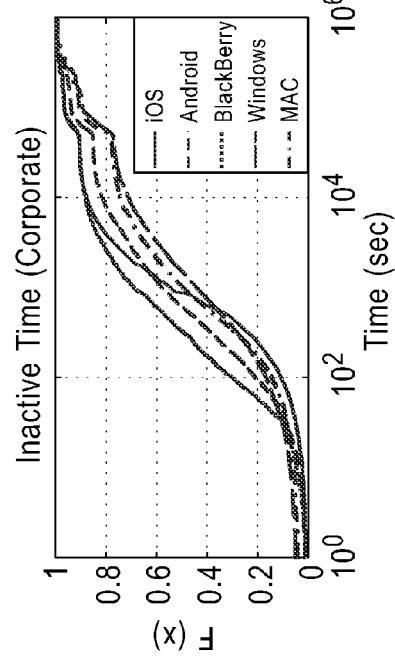

Active time starts when a device receives a DHCP acknowledgement message as a response to a DHCP request message. From the request messages, those messages generated when the client is either in the renewing or the rebinding state are excluded, as their purpose is to update the lease duration. However, the message from the init-reboot state is included, where the objective is to reconfigure the leases. An illustration of active and inactive times is depicted in FIG. 5.

FIG. 6 shows active and inactive times for the times are much smaller compared to laptop active times. Active times for iOS devices are smaller than the active times of other smartphones. This happens due to a combination of reasons related to: i) the way users use laptops and smartphones, and ii) the different policies related to energy management between laptops and smartphones. User behavior is difficult to analyze without having direct access on the devices, but the effects of different energy management policies on the active and inactive times can be clearly understood. For laptops the policy has been to keep the wireless interfaces always active, while for cellphones the interface can switch off after some period of inactivity. In iOS devices, if the device is not plugged in to power and the device display is switched off, the Wi-Fi interface is also switched off and the cellular network becomes the primary interface. On the other hand, in Android devices the user is allowed to configure the WiFi sleep policy, although there is not a unique default policy. There are various sleep policies: never sleep, never sleep when plugged in, sleep when screen turns off, sleep after 15 min, etc.

Finally, it is interesting to point out that in the educational network there are a large number of smartphone devices, especially iOS devices, which have an active time of one minute or less. The fact is attributed to when users roam from one part of the campus to another, their devices associate with some subnets for only a brief period of time. This has been confirmed with the educational network administrators, who also say that this was one of the reasons that they set the lease time to a relatively short 900 seconds.

DHCP Lease Policies

Ideally, a DHCP lease allocation policy should account for the differences in behavior of the various mobile devices. The goals of this policy should be to minimize the following, in decreasing priority:

Address space utilization: The policy should use as little of the available address space as possible, in order to support the most concurrent users.

Broadcast traffic: The policy should cause as few broadcasts as necessary, since broadcasts wake idle clients and consume power.

Server load: The policy should minimize the load on the DHCP server, to reduce the related CAPEX and OPEX expenses of running the server (including power).

We do this in two steps: first, we look at the behavior of the devices in isolation when varying the lease times over several orders of magnitude. Then, based on those behaviors, determine an approach that best meets the above goals. We wrote a simulator that, given a trace, reproduces the DHCP behavior and outputs the above metrics.

FIG. 7 shows the results from our simulator. Broadly, one can see the tension between the goals in the three sets of graphs. Shorter lease times utilize the address space most efficiently, but cause large amounts of broadcast traffic and high server load. Large lease times minimize broadcasts and server load, but at the expense of poor address space utilization.

Looking more closely, in FIG. 7a we see that address space utilization stays relatively flat versus lease times for each device type up until some threshold, after which utilization starts to grow logarithmically. In the corporate network and for iOS devices, the threshold is $1*10^3$ seconds; for Androids, $2*10^3$ seconds, and for laptops, $4*10^3$ seconds. In the educational network, the same pattern holds, but with half the threshold. This is an artifact of the shorter active periods in the educational network as illustrated in FIG. 6. As lease times go up, many leases are wasted on devices that have transitioned into the inactive period. This issue becomes more prevalent in smartphone devices since users have shorter access times and are more mobile compared to laptops.

In FIG. 7b we observe that lease duration does not affect the number of broadcast messages generated by the laptops in both networks. Laptop users have long active times, therefore the majority of their DHCP messages are renews, which are unicast. In contrast, the number of broadcasts generated by smartphones is sensitive to the lease time.

Shorter lease times incur larger numbers of broadcasts. This is because short lease time results in smartphones generating more request messages from the "selecting" state, as leases expire faster, and new leases require a full DCHP handshake, which incurs extra broadcast traffic.

In FIG. 7c, we see that server load levels off at about 1,000 seconds for smartphones, but 10,000 seconds for laptops. This is due to the longer active times of the laptop users, as was shown in FIG. 6.

Given these behaviors, we evaluated and compared the following DHCP lease policies:

Static policies: Fixed lease times of 15 minutes, 30 minutes, and 12 hours, for all devices.

Exponential adaptation [10], which allocates a short lease to a client once it arrives, and doubles the lease time every time the client renews its lease.

Differential lease, which allocates different lease times based on the device type. We choose values based on our analysis of FIG. 7. In the corporate network: iOS devices get 1000 seconds, Androids 2000 seconds, and Windows and Mac OS X 4000 seconds. In the educational network: iOS devices get 500 seconds, Androids 1000 seconds, and Windows and Mac OS X 2000 seconds.

FIG. 8 shows the results of our simulations. We see that our differential lease policy provides a good tradeoff between our goals for both networks. It is very efficient in address utilization, almost as much as the 15 minute lease policies, yet creates less broadcast traffic and server load. Exponential adaptation, on the other hand, uses a large amount of address space, but produces low amounts of broadcast traffic and DHCP server load on a daily basis.

Different environments may have different priorities among the goals outlined above, depending on their address space size, distribution of clients (smartphones vs. laptops), etc. However, using static values requires a manual tuning process to determine the right tradeoff for the environment. Moreover, setting small static leases may have an adverse impact on the user experience. Devices have to re-associate in the wireless network when a lease expires, which in some cases can take several seconds. Our differential lease policy allows devices that tend to have longer active times to receive longer leases. Hence, it should work well across many environments, with less administrative intervention as the mixture of devices continues to change.

Although most of the wireless networks are configured to dynamically allocate IP addresses, only a few studies focus on DHCP. Brick et al. [7] investigated the impact of lease times on DHCP performance. Khadikar et al. [10] studied the effects of longer DHCP lease times on the address space utilization. The present invention differentiates the device types and studies the DHCP usage patterns of smartphones. In addition, in contrast to previous studies the present invention combines DHCP and TCP/UDP transaction log files in order to better understand network usage patterns for each device type. Finally, the present invention provides DHCP leasing policies that account for the various device types and their behaviors.

With respect to device classification, Maier et al. [11] used a combination of IP TTL and HTTP user-agent information to classify device types among smartphones. Similarly, Erman et al. identified the devices based on user-agents string only. Gember et al. [9] cross-validated the user-agent results with the organization unique identifier of the MAC address. In contrast, the present invention uses a different classification approach based on DHCP information only. The present invention, apart from being more accurate compared to the previous art, enables new DHCP leasing policies that account for the different device types. Using the device classification technique of the present invention, such policies can be built in current DHCP server software without requiring any protocol changes.

CONCLUSION

It has become of increasing importance for network administrators to properly allocate DHCP lease times, due to the variety of devices connected to wireless local area networks. The present invention shows that smart-phones are primary responsible for the increase in the network address utilization, and fixed lease time policies are far from optimal, even when DHCP lease times are as low as one hour. In contrast, fix leased times of 15 minutes, while they significantly decrease address utilization, this lease time produce unnecessary DHCP related overhead. To reduce this overhead, the present invention provides a differential lease policy that assigns different lease values to each device type. The policy makes use of a novel device fingerprinting technique done at the DHCP server, without requiring any protocol changes. The main benefit of this new DHCP lease policy is that is insensitive to the actual mixture between laptop and smartphone devices, thus removing the need to manually tune DHCP lease times as the mixture of devices continues to change.

Figure 9:
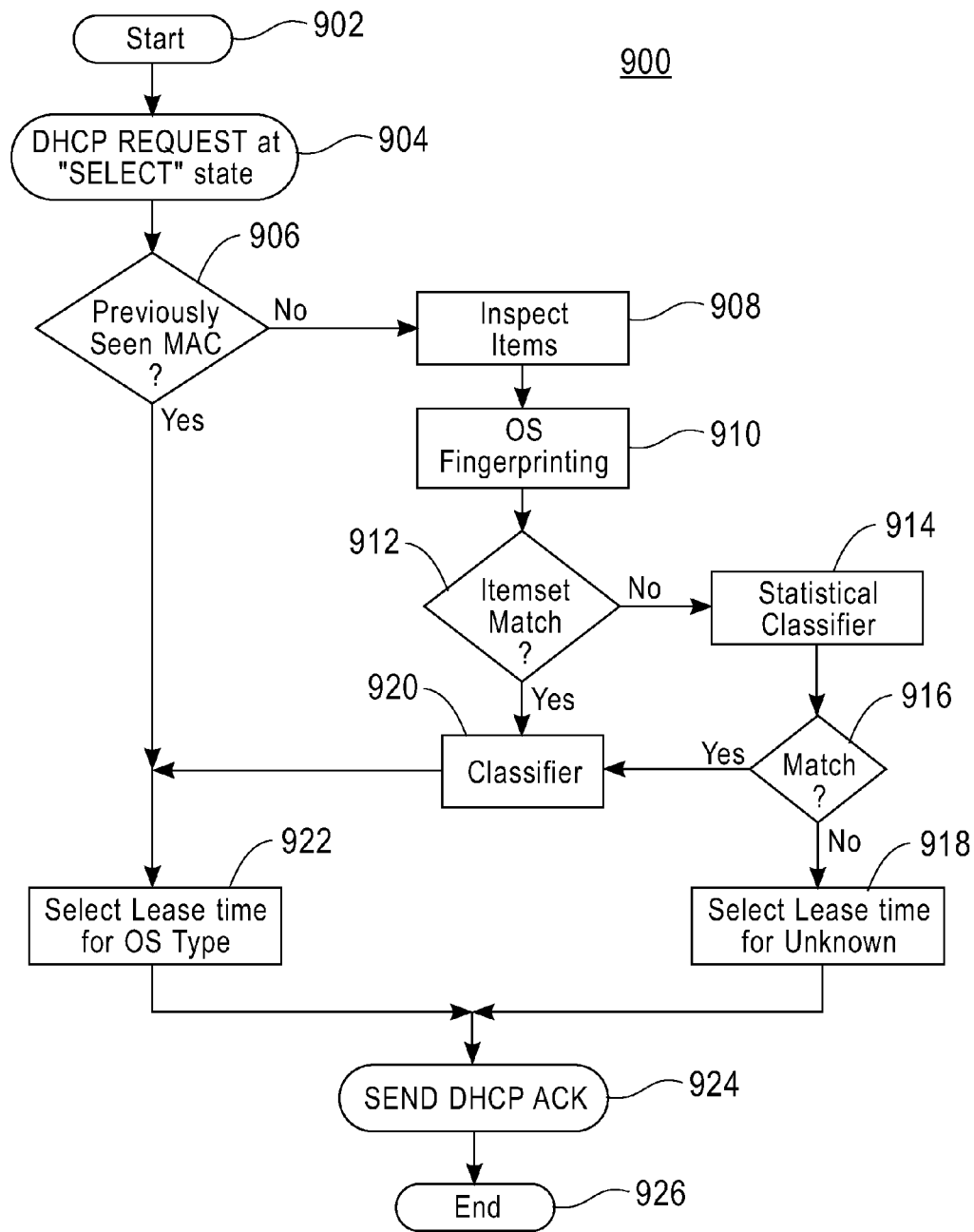
FIG. 9 is a flow chart of an operational phase of carrying out the present invention.

FIG. 9 is a flow chart 900 of an operational phase of carrying out the present invention. The process begins in step 902 and immediately proceeds to step 904 in which the host system such as DHCP server 124, inspects a request message or request packet ("selecting state) from one of the client systems 130-140. A test is made at step 906 to determine if the network address of the client system 130-140 has been previously registered with the DHCP sever 124. In the case in which the network address of the client system 130-140 has been previously registered with the DHCP sever 124 the process continues down to step 922 select lease time for operating system (OS) type and the DHCP sever 124 sends an acknowledgement (ACK) before the process ends in step 926. Machine Learning can be used to automate the lease selection in step 922. The use of supervised machine learning (including supervised learning, and reinforcement learning) may be used. Through the use of Machine Learning similar client systems 130-140 will get similar leases in step 922. Examples of software suites for Machine Learning include RapidMiner, LIONsolver, KNIME, Weka, ODM, Shogun toolbox, Orange, Apache Mahout, scikit-learn, mlpy, MCMLL, and OpenCV.

In the case in which the network address of the client system 130-140 has not been previously registered with the DHCP sever 124 the process continues down to inspect fields in the client generated request packet, e.g. a DHCP request packet (FIG. 2). A process known as "fingerprinting" or classifying using the fields in the request packet is performed in step 910. In the case there is a match, in step 912, and the item is classified in step 920, the process continues down to select lease time for operating system (OS) type and the DHCP sever 124 sends an acknowledgement (ACK) before the process ends in step 926. On the other hand, in the case there is not a match, in step 912, and the item is sent to a statistical classifier in step 914. Data mining, is used over the DHCP request header fields to determine the operating system. For example, apriori algorithm is used for learning association rules. Apriori is designed to operate on databases containing transactions (for example, collections of items bought by customers, or details of a website frequentation). Other algorithms may be used for associate rule learning including Eclat algorithm, FP-growth algorithm, GUHA procedure ASSOC, OPUS search or a combination thereof.

As is common in association rule mining, given a set of itemsets, in this case the fields of the DHCP requests packets, the algorithm attempts to find subsets, which are common to at least a minimum number C of the itemsets. Apriori uses a "bottom up" approach, where frequent subsets are extended one item at a time (a step known as candidate generation), and groups of candidates are tested against the data. The algorithm terminates when no further successful extensions are found. User intervention along with the automatic association rule mining can also be used. The output of Apriori is sets of rules that tell us how often items are contained in sets of data.

In the case a match is found in step 916, the client system 930-940 is classified in step 920. The process continues down to select least time for operating system (OS) type and the DHCP server 124 sends an acknowledgement (ACK) before the process ends in step 926.

On the other hand, in the case a match is not found in step 916, the client system 930-940 is classified in step 918 typically by a user or a default classification is used. The process continues down to select lease time for operating system (OS) type and the DHCP sever 124 sends an acknowledgement (ACK) before the process ends in step 926.

Information Processing System

Figure 10:
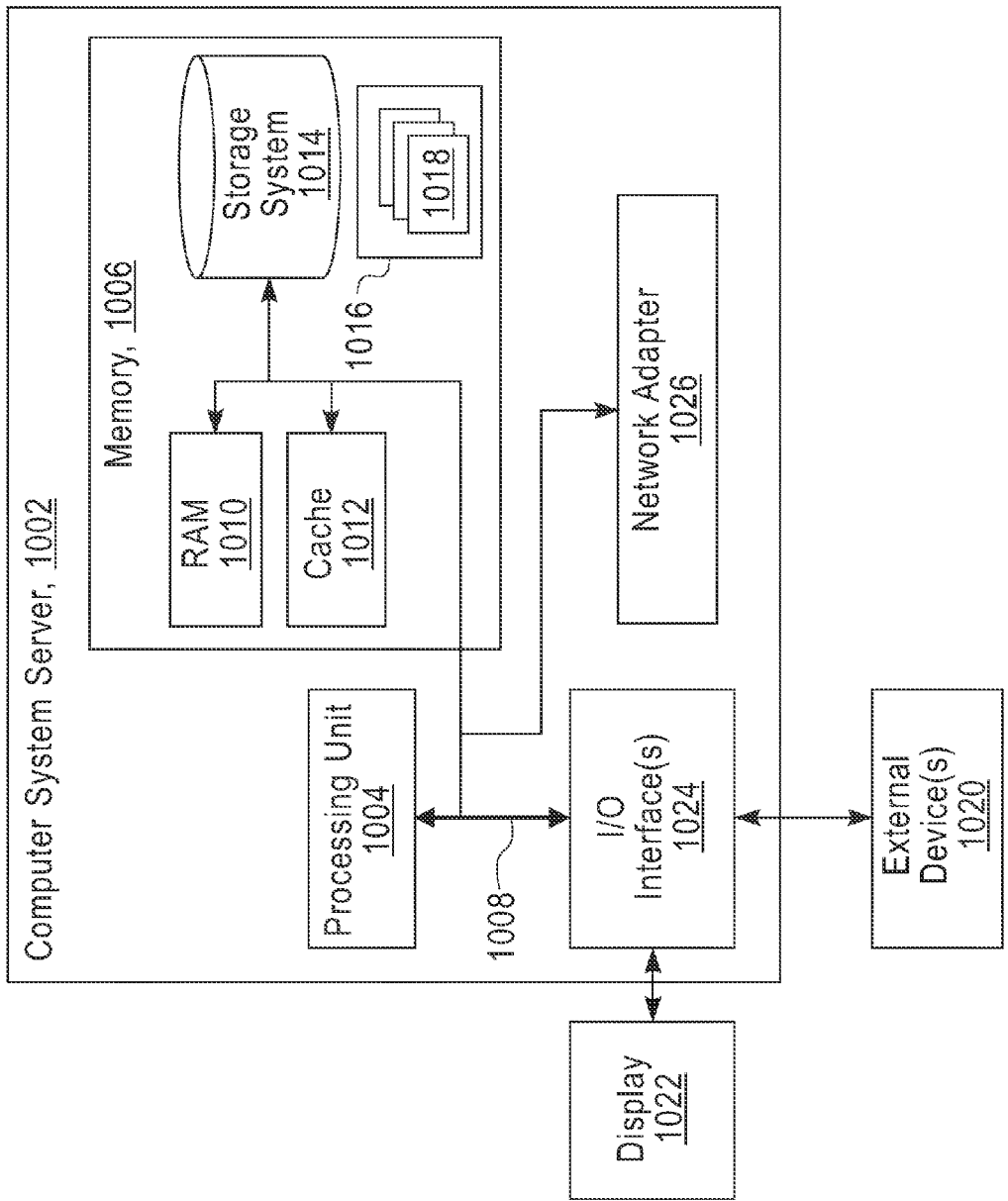
FIG. 10 is a block diagram illustrating a detailed view of an information processing system for carrying out the operation of FIG. 9.

FIG. 10 illustrates one example of a detailed view of an information processing system for carrying out the operation of FIG. 9, which can be deployed in the DHCP server 124 and/or in server 128. Any suitably configured processing system can be used as the information processing system 1002 in embodiments of the present invention. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes the OS fingerprinting 910, the statistical classifier 914, the select lease time type 922 or a combination thereof. The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs (e.g., the OS fingerprinting 910, the statistical classifier 914, the select lease time type 922), other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

REFERENCES

Each of the following twelve references are hereby incorporated by reference in their entirety.
[1] The Bro network security monitor (http://bro-ids.org/).
[2] Ethernet number registration (http://www.iana.org/assignments/ethernet-numbers).
[3] Microsoft DHCP vendor and user classes (http://support.microsoft.com/kb/266675).
[4] B. Aboba, J. Carlson, and S. Cheshire. RFC 4436 Detecting Network Attachment in IPv4 (DNAv4). IETF (http://www.ietf.org/rfc/rfc4436.txt, March 2006).
[5] R. Agrawal, R. Srikant, et al. Fast algorithms for mining association rules. In VLDB, 1994.
[6] Apple. DHCP client software (http://www.opensource.apple.com/source/bootp/bootp-198.2/IPConfiguration.bproydhcp.c).
[7] V. Brik, J. Stroik, and S. Banerjee. Debugging DHCP performance. In Proceedings of the 7th ACM SIGCOMM Internet Measurement Conference, pages 257-262. ACM, 2004.
[8] R. Droms. Dynamic host configuration protocol. IETF RFC 2131, March 1997.
[9] A. Gember, A. Anand, and A. Akella. A comparative study of handheld and non-handheld traffic in campus wi-fi networks. In Passive and Active Measurement, pages 173-183. Springer, 2011.
[10] M. Khadilkar, N. Feamster, M. Sanders, and R. Clark. Usage-based DHCP lease time optimization. In Proceedings of the 7th ACM SIGCOMM Internet Measurement Conference, pages 71-76. ACM, 2007.
[11] G. Maier, F. Schneider, and A. Feldmann. A first look at mobile hand-held device traffic. In Passive and Active Measurement. Springer, 2010.
[12] D. Simmons. Rapid DHCP redux (http://cafbit.com/entry/rapid_dhcp_redux).

NON-LIMITING EXAMPLES

The OS fingerprinting in the present invention can be leveraged for other business cases including: Bring Your Own Device (BYOD) business policies, and enhances mobile security. Layers can be added for finer grain classification and identification of VMs. Differential DHCP Lease does not require any protocol changes: Can be deployed as a software solution in DHCP servers; and removes the burden of updating all leases when new devices are introduced.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable storage product or computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium or computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to set lease times values in a network protocol for a device, the method comprising:
   inspecting, at a host system, a network request packet generated by a client system;
   classifying the client system into a category from a plurality of categories based on the network request packet; and
   using the category to associate a value of a lease time for the client system.

2. The method of claim 1, wherein the using the category to associate a value of a lease time for the client system includes receiving input from a user to the host system to associate the value of the lease time.

3. The method of claim 1, wherein the using the category to associate a value of a lease time for the client system includes automatically associating the value of the lease by historical data of request messages with a machine learning algorithm.

4. The method of claim 3, wherein the classifying the client system into a category from a plurality of categories based on the network request packet includes classifying with an algorithm for learning association rules.

5. The method of claim 1, wherein the using the category to associate a value of a lease time for the client system includes receiving input from a user to the host system to associate the value of the lease time and automatically associating the value of the lease by historical data of request messages with a learning algorithm.

6. The method of claim 3, wherein the automatically associating the value of the lease by machine learning training data of request messages received at the host.

7. The method of claim 1, wherein the using the category to associate a value of a lease time for the client system includes using an operating system of the client system and a type of the client system.

8. The method of claim 1, wherein the inspecting, at the host system, a network request packet generated by a client system includes inspecting at the host system with a DHCP server a request packet that is a DHCP request message.

9. The method of claim 8, wherein the inspecting, at the host system, the network request packet generated by the client system includes inspecting one or more of fields in the DHCP request message of a host-name field, a vendor-name field, a parameter-request field, an organization unique identifier field and sequence of option parameters.

10. The method of claim 1, further comprising:
    responding to the request packet with the lease time that has been associated with the client system.

* * * * *